United States Patent [19]

Getz et al.

[11] Patent Number: 4,706,327
[45] Date of Patent: Nov. 17, 1987

[54] AUTOMATIC VACUUM NOZZLE HEIGHT ADJUSTMENT SYSTEM FOR VACUUM CLEANER

[75] Inventors: Edward H. Getz, Eau Claire; Kurt Werner, St. Joseph Township, Berrien County; Roger D. Burdi, Royalton Township, Berrien County, all of Mich.

[73] Assignee: Whirlpool Corporation, Benton Harbor, Mich.

[21] Appl. No.: 868,535

[22] Filed: May 30, 1986

[51] Int. Cl.⁴ ............................................ A47L 9/28
[52] U.S. Cl. .................................... 15/319; 15/339; 15/354
[58] Field of Search .................. 15/319, 339, 354, 356

[56] References Cited

U.S. PATENT DOCUMENTS

| 1,428,734 | 9/1922 | Wise et al. | |
|---|---|---|---|
| 2,107,016 | 2/1938 | Snyder | |
| 2,146,602 | 2/1939 | Spooner, Jr. | |
| 2,259,386 | 10/1941 | Luse | |
| 2,343,227 | 2/1944 | Sellers et al. | 15/319 |
| 2,515,671 | 7/1950 | Snyder et al. | |
| 2,526,419 | 10/1950 | Reeves et al. | 15/319 |
| 2,592,710 | 4/1952 | Kirby | 15/319 |
| 2,730,751 | 1/1956 | Brace | |
| 2,730,752 | 1/1956 | Seck | |
| 2,734,217 | 2/1956 | Brace | |
| 2,753,585 | 7/1956 | Eberhart | 15/319 |
| 3,683,448 | 8/1972 | Lagerstrom et al. | 15/354 |
| 3,713,185 | 1/1973 | Clowers et al. | 15/354 |
| 4,199,839 | 4/1980 | Martinec | 15/354 |
| 4,437,205 | 3/1984 | Koland | 15/354 |
| 4,654,924 | 4/1987 | Getz et al. | 15/339 |

Primary Examiner—Philip R. Coe
Assistant Examiner—C. Reinckens
Attorney, Agent, or Firm—Hill, Van Santen, Steadman & Simpson

[57] ABSTRACT

A vacuum cleaner includes a device which senses brush speed while varying nozzle height settings until an optimum height setting is reached. Nozzle height is varied by a motor that rotates a cam to move a support roller and is set by stopping the motor when a predetermined brush speed condition is reached. A programmed control circuit senses the brush speed while controlling the cam motor.

15 Claims, 8 Drawing Figures

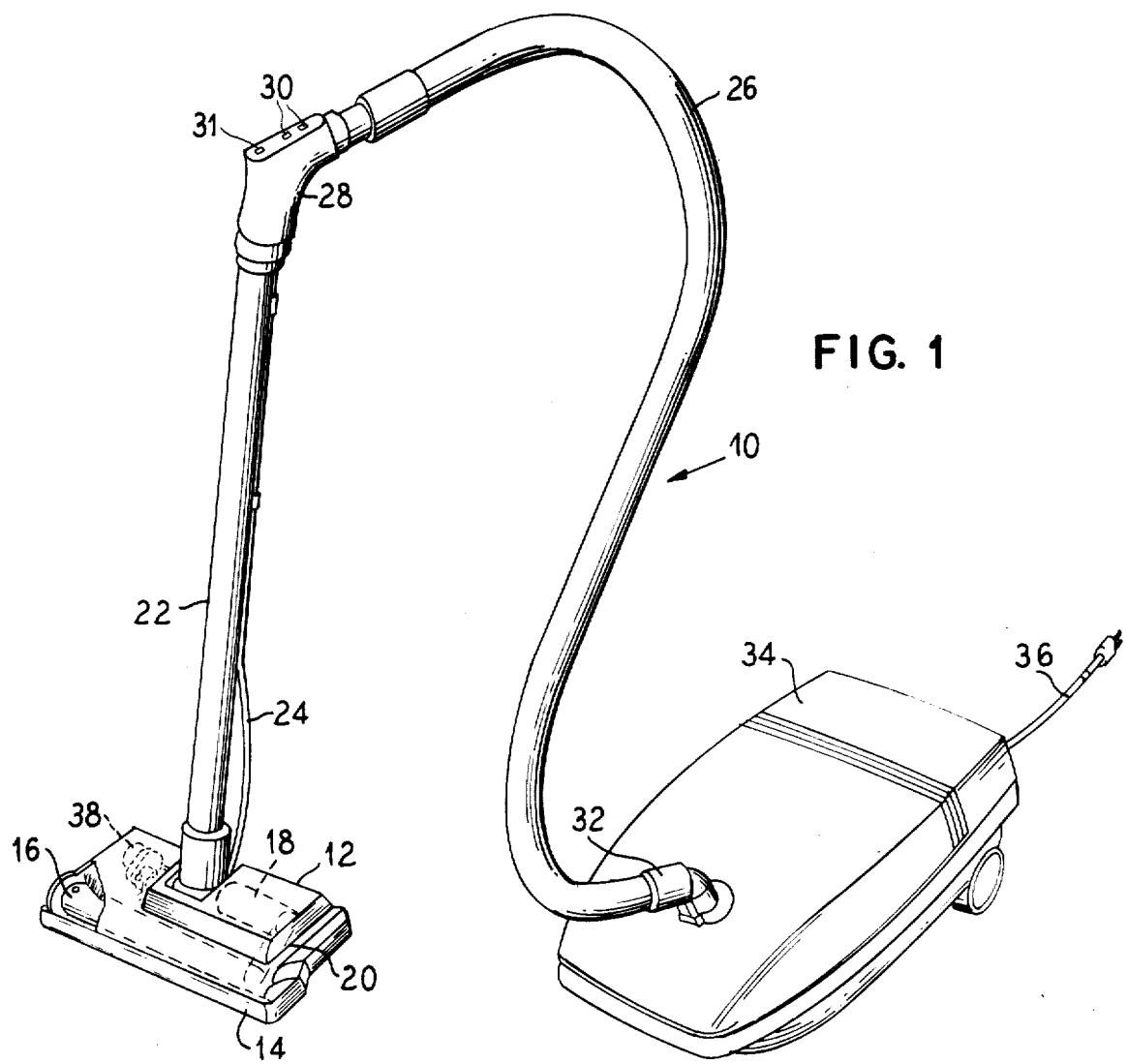
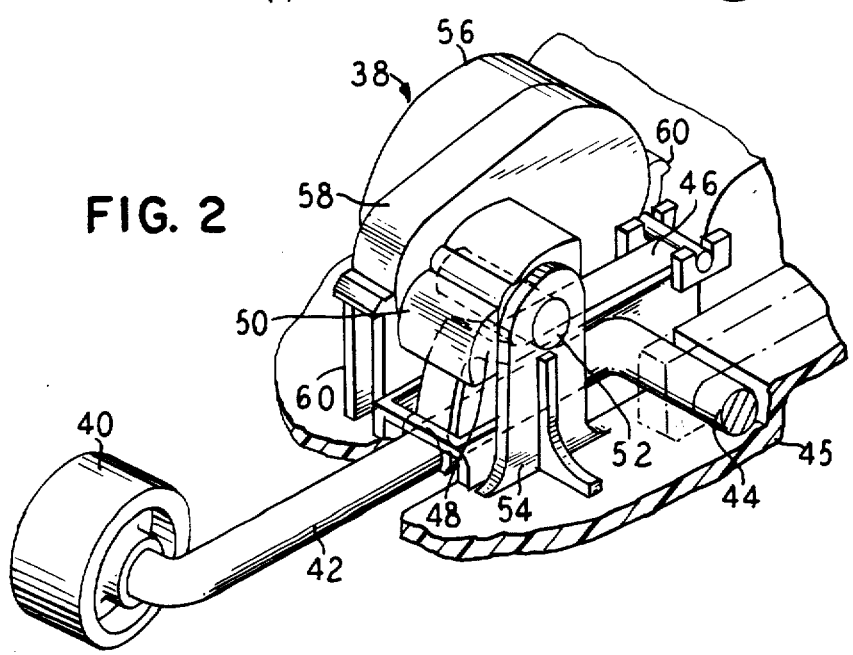

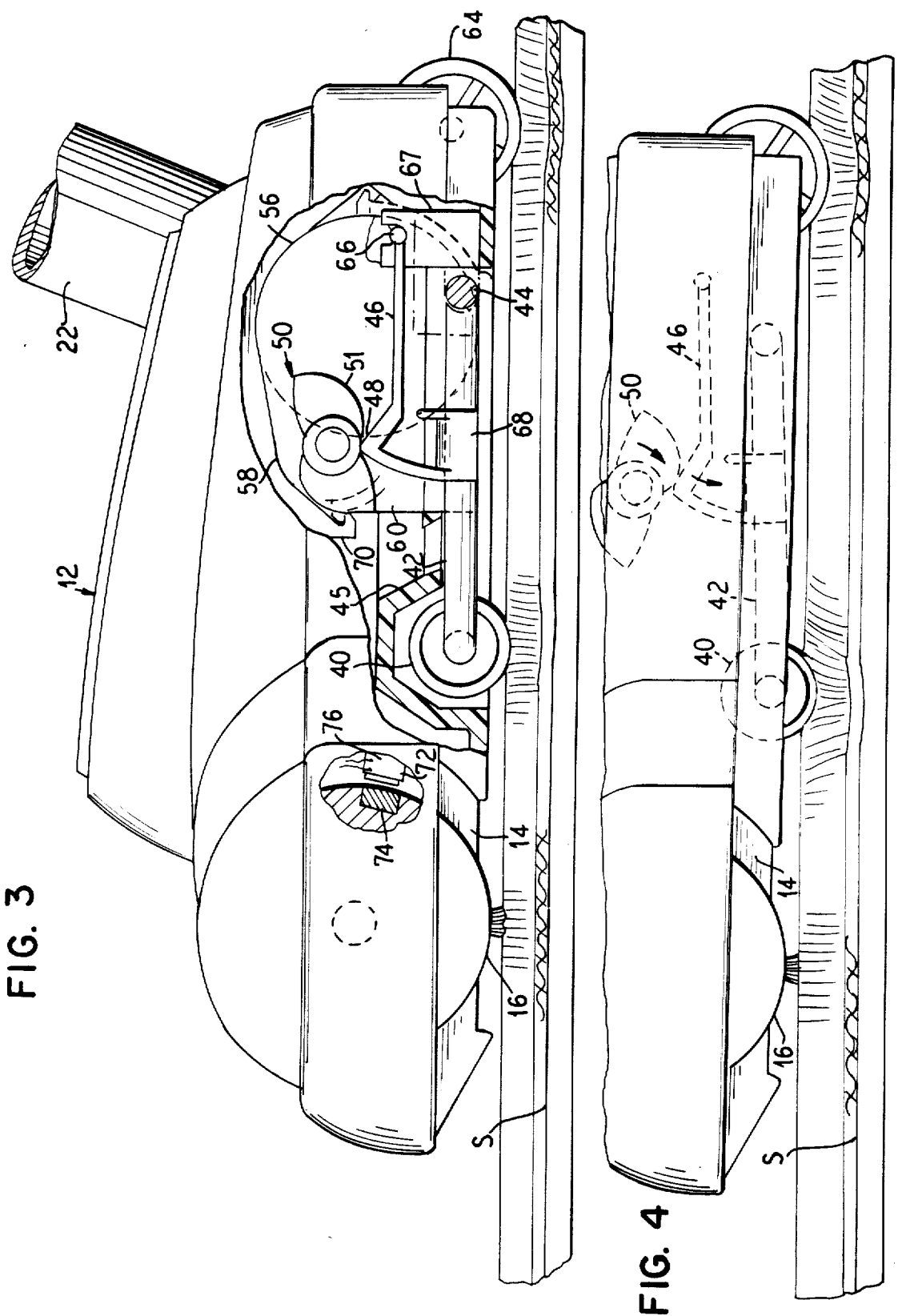

AUTOMATIC VACUUM NOZZLE HEIGHT ADJUSTMENT SYSTEM FOR VACUUM CLEANER

CROSS-REFERENCE TO RELATED APPLICATIONS

Reference is made to co-pending patent application, Ser. No. 815,384, filed Dec. 31, 1985.

BACKGROUND OF THE INVENTION

1. Field of the Invention

The present invention relates generally to an automatic vacuum cleaner, and, more specifically, to an automatic pile height sensing and vacuum nozzle height adjusting device.

2. Description of the Prior Art

Many devices are known for manually adjusting a vacuum cleaner height to accommodate different types of floor coverings. A vacuum cleaner nozzle lifting device is disclosed in U.S. Pat. No. 4,437,205 in which an adjustable wheel assembly is moved by a sliding lever with a cam follower. The cam follower engages a cam which is rotatable by a foot operated pedal to successive rotational positions and is held in such positions by tooth engaging notches on a ratchet wheel. Pile height sensing and automatic height adjustment are not disclosed.

In U.S. Pat. No. 4,199,839, a wheel height adjusting mechanism includes an adjusting knob connected to an eccentric block that engages an offset portion of a roller lever.

Other cam-type height adjusting mechanisms are known, including: U.S. Pat. No. 3,683,448 that discloses the use of either a sliding or rotationally operated cam; U.S. Pat. No. 2,734,217 which discloses a push button operated cam; U.S. Pat. No. 2,730,751 that discloses a sliding control lever to move a cammed surface; and U.S. Pat. No. 2,730,752 in which an arcuate section moves cooperatively with the vacuum cleaner handle to adjust nozzle height.

A leaf spring controlled height adjustment is disclosed in U.S. Pat. No. 2,515,671; a pedal operated crank pin moving in a lever slot adjusts vacuum cleaner height in U.S. Pat. No. 2,146,602; while threaded height adjusting means are disclosed in U.S. Pat. Nos. 2,259,386; 2,107,016; and 1,428,734.

SUMMARY OF THE INVENTION

The present invention improves vacuum cleaner performance by automatically adjusting nozzle height as a function of brush speed to accommodate different floor coverings on which the vacuum cleaner is used. The height of a vacuum cleaner nozzle from a floor determines not only the cleaning capability of the vacuum cleaner, but also the ease with which the vacuum cleaner may be moved across the floor surface. Lower height settings provide better cleaning capabilities, while higher nozzle height settings enable the vacuum cleaner to be moved more easily. The present device automatically determines an optimum nozzle height by sensing brush speeds for optimal good cleaning characteristics and easy operation. The device then automatically sets and maintains the nozzle height to such optimum height setting.

Since the rotatable brush in a vacuum cleaner is typically mounted in fixed relationship with the vacuum nozzle, the speed at which the brush rotates corresponds to the height of the vacuum nozzle from a floor surface. As the nozzle is lowered, the rotating brush encounters the floor covering, such as carpet fibers, and its speed is thereby reduced. Further lowering of the nozzle increases the amount of contact with the floor covering and causes further reductions in the brush speed. The present invention utilizes such correlation to sense and select an optimum nozzle height. The height selection is accomplished by automatically moving the nozzle through the range of possible height settings and simultaneously sensing the speed of the rotating brush. In a preferred embodiment, a microprocessor based control senses the changing brush speed and selectively sets the nozzle height accordingly.

The nozzle height is adjusted by cam in contact with a cam follower which is connected to move an offset axle on which a pair of wheels are mounted. In a preferred embodiment, the control operates a motor which drives a rotatable cam. The nozzle height is continuously variable to a nearly infinite number of settings so an optimum setting is possible for any floor covering.

Although the present device may be used in any type of vacuum cleaner having a rotating brush or other rotating carpet cleaning member, it is particularly useful in canister-type vacuums having a power vacuum head. The power vacuum head is generally lighter than an upright vacuum and, thus, an improper height setting has a more significant effect on the performance and ease of use of a canister vacuum.

The present invention, thus, avoids guess work as to the proper pile height setting for a particular floor covering and provides an improved, easy to use vacuum cleaner.

BRIEF DESCRIPTION OF THE DRAWINGS

FIG. 1 is a perspective view of a canister vacuum cleaner including an automatic nozzle height adjustment device according to the present invention mounted in a power vacuum head;

FIG. 2 is an enlarged fragmentary view of the nozzle height adjusting device of FIG. 1;

FIG. 3 is a side elevational view of the power vacuum head of FIG. 1, partially cut away to reveal a brush speed sensor and the height adjusting device;

FIG. 4 is a partial side elevational view of the power head of FIG. 3 showing the vacuum nozzle adjusted for somewhat deeper carpet pile;

DESCRIPTION OF THE PREFERRED EMBODIMENTS

Figure 6:
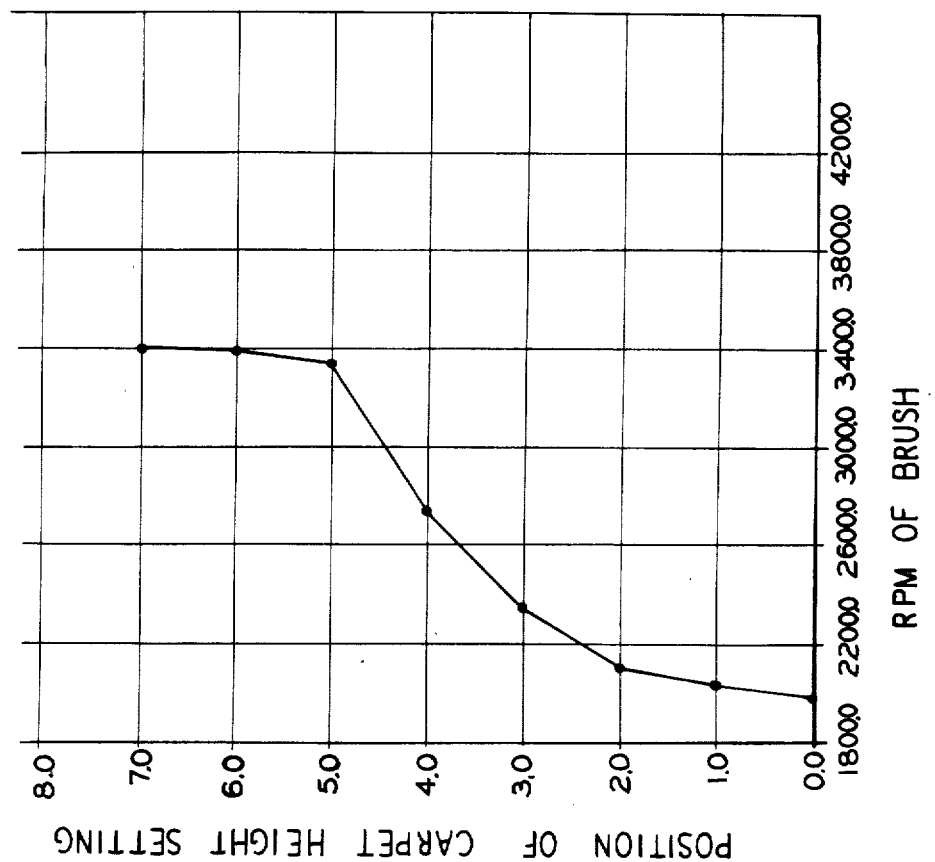
FIG. 6 is a graph similar to that of FIG. 5 for a second floor surface and for a different power line voltage.

In FIG. 1 there is shown generally a canister vacuum cleaner 10 which includes a power vacuum head 12 having a suction nozzle 14 provided with a rotating brush, or beater bar, 16 driven by a brush motor 18 through a drive belt 20. The power head 12 is provided with a hollow wand section 22 and a power and communication cord 24 connected to a suction hose 26 at a handle 28, which includes a plurality of electrical controls and displays 30. A switch 31 is included for initiating the automatic pile height adjustment function, and may include a display for indicating the nozzle height setting chosen. Suction is provided to the nozzle 14 through the suction hose 26 which is attached to a suction inlet 32 of a canister suction unit 34 that is connectible to AC power through a power cord and plug 36. In accordance with this invention, an automatic nozzle height adjustment device 38 is mounted in the power head 12.

Referring to FIG. 2, the nozzle height adjustment device 38 includes a roller 40 rotatably attached to an offset axle 42 which is pivotable about a bight portion 44 secured to a power head housing 45. The roller 40 is one of a pair of rollers mounted at opposed offset ends of the offset axle 42 which is pivotable to raise or lower the forward portion of the power head 12 for pile height adjustment. The nozzle height adjustment device 38 also includes a lever 46 slidably connected to the offset axle 42. The lever 46 includes a cam follower 48 mounted for cooperative engagement with a rotatable cam 50 mounted on a cam axis 52. The cam axis 52 is supported at one end by a bracket 54 and is rotatably driven by a motor 56 and speed reducer 58 affixed to an opposite end of the cam axis 52. The motor 56 and speed reducer 58 are supported by motor mounts 60 mounted to the power head housing 45.

As can be seen in FIG. 3, the movable roller 40, in conjunction with a stationary roller 64, determines the height of the brush 16 from the apparent floor surface S. By moving the roller 40 pivotally with respect to the power nozzle 12, the brush 16 is raised and lowered to accommodate different pile heights of floor coverings. The roller 40 on the offset axle 42 is moved by the lever 46 which pivots about a pivot axle 66 in a mount 67 in response to rotation of the cam 50. The cam 50 is a dual cam with symmetrical linear rise cam surfaces 51. As the cam 50 rotates, the linear rise cam surface 51 abuts the cam follower 48 to cause the lever 46 to pivot about its pivot axis 66. This results in a sleeve portion 68 of the lever 46 sliding along the offset axle 42, which in turn pivots the axle 42 about the bight portion 44 to raise or lower the roller 40. The motor 56 is preferably either a synchronous motor or a stepper motor and is precisely controlled to rotate the cam 50 through the speed reducer 58 to accurately set the height of the nozzle 14 above the surface S. An upper motor mount 70 is mounted in an upper portion of the housing 45 and engages the lower motor mount 60 to hold the motor 56 and speed reducer 58 in place.

A brush speed sensor 72 is mounted adjacent the rotating brush, or beater bar, 16 within the power head 12. In a preferred embodiment, the speed sensor 72 includes a permanent magnet 74 mounted in the rotating brush 16 and a pick-up coil 76 mounted adjacent the brush 16 to detect the motion of the magnet 74 as the brush 16 rotates.

In FIG. 4, the cam 50 is rotated clockwise somewhat from the position shown in FIG. 3 which causes the cam follower 48 of the lever 46 to slide along the cam surface 51. This causes the lever 46 to pivot downwardly to pivot the roller 40 downward and thereby raise the brush 16 and nozzle 14 from the floor surface S.

Figure 5:
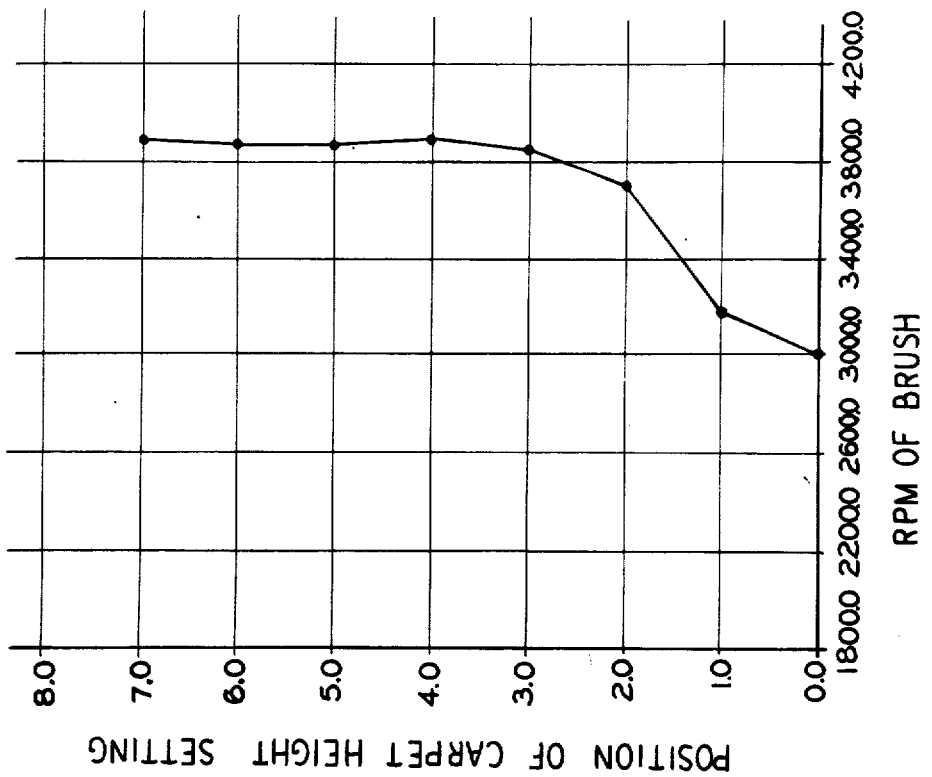
FIG. 5 is a graph showing brush speed changes for changes in nozzle height on a first floor surface.

FIGS. 5 and 6 show the speed characteristics of the rotating brush 16 over a range of height settings on two different floor coverings and at two different power line voltages. The brush speed characteristic on a bare floor for a plurality of nozzle height settings is shown in FIG. 5. At the lowest height setting, indicated by 0.0, the brush rotation speed is 3000 rpm. As the height setting is changed to raise the brush 16 from the floor, the brush 16 encounters less resistance from contact with the floor and the speed increases. The brush speed reaches a maximum when the brush is completely clear of the floor surface which, for the test recorded on the graph of FIG. 5, is approximately 3900 rpm. A brush speed of 3200 rpm provided the best comprise of cleaning and ease of use, which corresponds to a height setting at position 1.0.

In FIG. 6, the brush speed characteristics are shown for a range of height settings as the present device is used on a shag carpet. At the lowest setting, the brush speed is relatively slow due to a significant amount of contact with the carpet nap. The brush speed increases as the nozzle 14 is raised and the contact is less. The increase in speed occurs at a slower rate and at higher settings than when the device is run on a bare floor since the longer pile of the shag carpet remains in contact with the rotating brush at greater height settings. A maximum speed of approximately 3400 rpm is reached at the high settings. For the desired brush speed of 3200 rpm in FIG. 6, the nozzle is set to 4.7.

The brush speeds possible in FIG. 6 are shifted to a lower range than in FIG. 5 due to a lower line voltage. Differences in line voltage are often present from one power supply system to another as a result of changes in loads on line power, which results in different speed ranges being available. The maximum speed attained is also limited somewhat by contact between the brush and the ends of the carpet fibers, even at the higher settings. Changes in the speed range can result in the desired brush speed being outside the range of possible speeds, in which case the highest or, respectively, lowest speed is selected as the running speed.

It is also foreseen to use the slope, or percentage change, of the speed characteric to determine the height setting. The brush speed characteristic has a determinable slope for each quantity of brush/floor covering resistance, and, thus, the brush speed can be selected from a predetermined slope corresponding to a desired quantity of such resistance.

Figure 7:
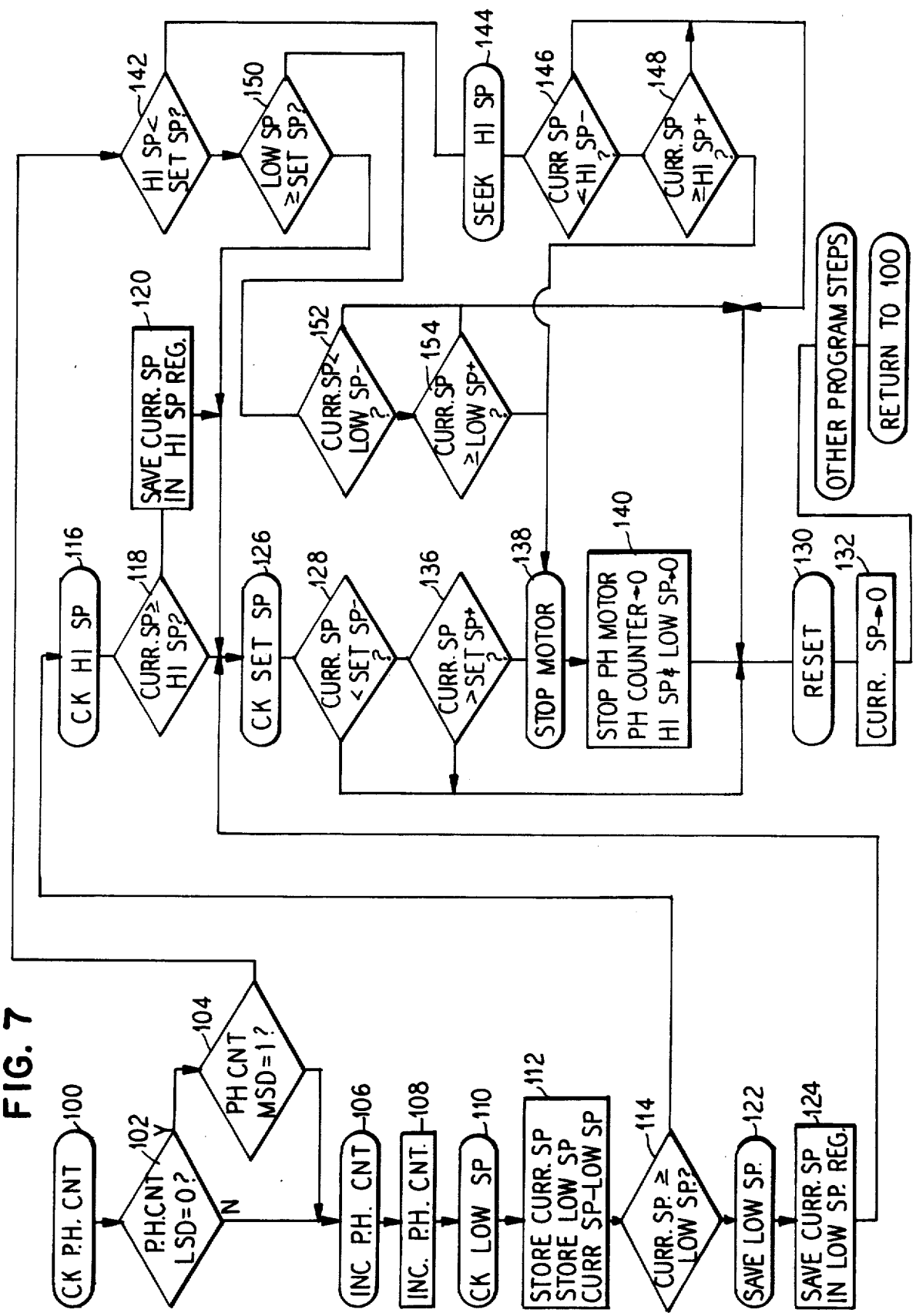
FIG. 7 is a flow chart depicting a pile height sensing control method for use in a control circuit for the present invention.

An automatic pile height control method is shown in FIG. 7 for use in a microprocessor based control having a main control program and a plurality of internal registers. The control generally checks the brush speed at various height settings and thereby sets the appropriate nozzle height. The operation of the control begins upon the activation of the switch 31 on the handle 28. At each switch activation, the nozzle height is readjusted to a setting appropriate for the floor covering.

The control method of FIG. 7 begins at 100 by checking a pile height counter (P.H.CNT.) for one full revolution of the cam 50. The pile height counter is an internal register of a microprocessor based control that is incremented upward as the cam 50 is rotated and that reaches a full count of 32 upon one full revolution of the cam 50. First, the least significant digit of the pile height counter is checked, at step 102, to determine if it is equal to 0. If the least significant digit is equal to 0, then the pile height counter's most significant digit is checked to determine whether it is set at 1, indicating that the counter is at a binary 32 at step 104. If the most significant digit is not 1, indicating the full count has not been reached, the pile height counter is incremented at steps 106 and 108.

As the counter is incremented, the cam is rotated, during which lowest and highest brush speeds are measured. The lowest speed is stored at step 110. A current speed of the brush is then compared to the lowest speed measured at step 112 by storing both the current speed of the brush and the lowest speed and then subtracting the low speed from the current speed. If the current speed is greater than or equal to the lowest speed measured at step 114, then the current speed is compared to the highest speed that was measured at step 116. If the current speed is greater than the highest speed at step 118, the current speed is saved in the high speed register at 120.

If at step 114 the current speed is less than the lowest speed measured, then the current speed is saved in the low speed register at steps 122 and 124. In either instance, the set speed, or desired brush speed, is checked at step 126. Current speed is compared to the set speed minus a small tolerance at step 128. If the current speed is less than the set speed minus a small tolerance, then the device is reset, including setting a current speed register to 0 at step 132 and running other known steps in a main control program. After a predetermined time interval, such as ½ second, the main control program returns to step 100.

If at 128 the current speed is found to be greater than the set speed minus a small tolerance, then the current speed is compared to the set speed plus a small tolerance at step 136. If the current speed is greater than the set speed plus a small tolerance, the system is reset at 130 and the current speed register is zeroed at 132. If, on the other hand, the current speed is less than the set speed plus a small tolerance, the pile height motor is stopped at step 138.

If at step 104 the pile height counter most significant digit is equal to 1 indicating a full count of the pile height counter, then the set speed is compared to the highest speed that was measured at 142. If the set speed is higher than the highest speed that was measured then the current speed is compared to the highest speed minus a small tolerance. At steps 144 and 146, if the current speed is greater than the high speed minus a small tolerance then the current speed is compared to the highest speed plus a small tolerance at step 148. If the current speed is greater than the highest speed plus some tolerance, then the system is reset and a new speed is measured at 130 and 132. If, on the other hand, the current speed is less than the highest speed plus a tolerance, the pile height motor is stopped at 138 and 140. If the current speed is less than the high speed minus a small tolerance at step 146, then the system is reset and a new speed is measured at 130 and 132.

If at block 142 the highest speed measured is greater than the set speed, then at block 150 the set speed is compared to the lowest speed that was measured. If the set speed is lower than the lowest speed that was measured, the current speed is compared to the lowest speed minus a small tolerance at block 152. If the current speed is less than the lowest speed minus a small tolerance, the system is reset and a new speed is measured at blocks 130 and 132. If, on the other hand, the current speed is greater than the lowest speed minus a small tolerance, the current speed is compared to the lowest speed plus a small tolerance at block 154. If the current speed is greater than the lowest speed plus some tolerance, the system is reset at blocks 130 and 132, and a new speed is measured, while if the current speed is less than the lowest speed plus a small tolerance the pile height motor is stopped at blocks 138 and 140.

If at block 150 the set speed is greater than the lowest speed that was measured, then the current speed is compared to the set speed minus a small tolerance at 128, and if the current speed is less than the set speed minus a small tolerance, the system is reset and a new speed is measured at 130, while if the current speed is greater than the set speed minus a small tolerance, the current speed is compared to the set speed plus a small tolerance at block 136. Depending on the outcome thereof, the system is either reset or the pile height motor is stopped. If at block 118 the current speed is less than the high speed that was measured, the current speed is compared to the set speed minus a small tolerance at 128, and if it is less than the set speed minus the tolerance, the system is reset, while if it is greater than the set speed minus a small tolerance, the current speed is compared to the set speed plus a small tolerance and depending on the outcome, the system is either reset or the pile height motor is stopped.

Thus, the above described control operation sets the current speed at or near the set speed by stopping the pile height adjustment motor at an appropriate time.

The pile height control can be overridden and the nozzle height set by the user of the vacuum 10 by holding the switch 31 in an actuated position and then releasing the switch when the nozzle 14 is at the desired height, but before the control stops automatically at the height it would otherwise select.

Figure 8:
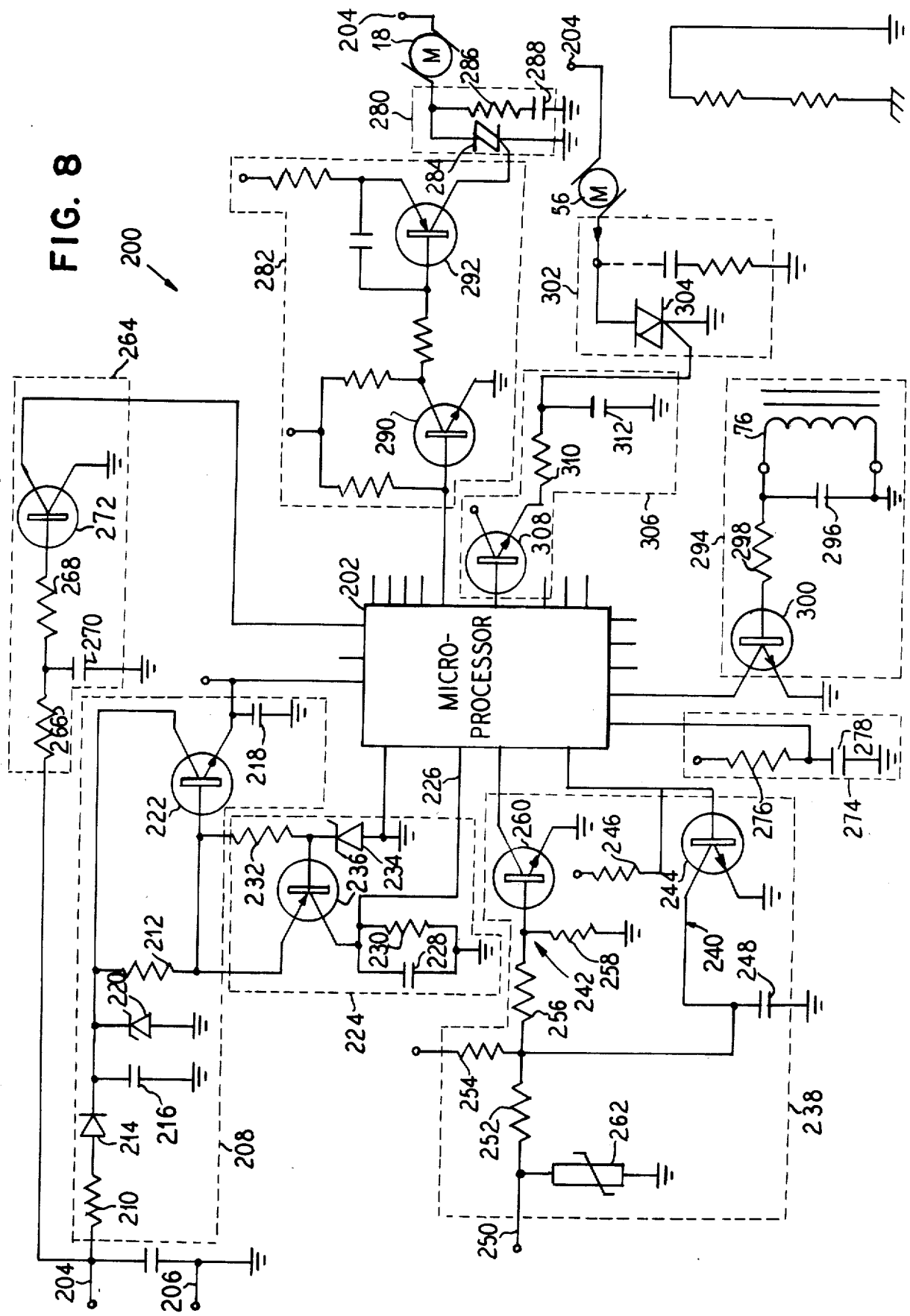
FIG. 8 is a circuit diagram showing a control circuit for the automatic nozzle height adjustment device.

Referring to FIG. 8, a control circuit 200 for use in the present pile height adjusting system is shown, including a microprocessor 202. Line voltage is supplied to the circuit 200 at terminals 204 and 206 by a dc power supply 208 including resistors 210 and 212, a diode 214 for rectifying the ac input, filtering capacitors 216 and 218, a zener diode 220, and a transistor 222. The dc power supply 208 supplies a dc voltage to the microprocessor 202 and the rest of the circuit 200. A reset portion 224 is connected to a reset lead 226 of the micro-processor 202 and includes a capacitor 228, resistors 230 and 232, a zener diode 234, and a transistor 236. The transistor 236 provides a delayed reset signal to the microprocessor 202 by remaining in a nonconducting state until substantially full power is received from the dc power supply 208.

A communication portion 238 includes a transmit circuit 240 and a receive circuit 242 for communication with other micro-processors in other portions of the vacuum cleaner 10. The transmit circuit 240 has a transistor 244 along with a resistor 246 and capacitor 248 which are controlled to transmit serial data over a communication lead 250. The receive circuit includes resistors 252, 254, 256, and 258, along with a transistor 260 for receiving serial data present on communication lead 250. A zener breakdown element 262 is also included in the communication section 238. The state of the user operable control switch 31 may, by way of example, be communicated to the microprocessor 202 via a signal on lead 250 to the receive circuit 242.

Communication to and from the microprocessor 202 is in synchronization with the 60 Hertz ac line voltage. A 60 Hz. signal generator 264 for such synchronization includes resistors 266 and 268, a capacitor 270 and a transistor 272. Internal functions of the microprocessor 202 are controlled by a clock signal which is controlled by an RC circuit 274 having a resistor 276 and a capacitor 278.

The microprocessor 202, through a triac power control 280 and a triac driver 282, controls the function of the motor 18 which drives the brush 16. The triac power control 280 includes a triac 284 connected in parallel with a resistor 286 and capacitor 288. The triac driver 282 is a two-stage amplifier including transistors 290 and 292 with their respective biasing resistors.

A speed sensor 294 is utilized by the microprocessor 202 to determine the rotational speed of the brush 16 and includes the pick-up coil 76 across which is connected a capacitor 296. A resistor 298 connects the pick-up coil to the base of a transistor 300 which transmits brush speed signals to the microprocessor 202.

The pile height motor 56 is controlled by a pile height triac control 302 including a triac 304 that is operated by a pile height triac driver 306 including a transistor 308, a resistor 310 and a capacitor 312.

Thus, there has been shown improvements in a vacuum cleaner 10 which upon activation of a switch automatically senses the pile of a floor covering and sets the vacuum cleaner's vacuum nozzle 14 to a height appropriate for the respective floor covering. Vacuum nozzle height is set using a correspondence between the brush speed and the pile height setting so that the vacuum is easy to use while still providing effective floor cleaning.

The embodiments of the invention in which an exclusive property or privilege is claimed are defined as follows:

1. A height adjustment apparatus for use in a vacuum cleaner having a brush mounted for rotation in proximity to a vacuum nozzle orifice and a motor for rotating said brush, comprising:
   means for adjusting the height of said brush from a surface to vary the speed of the motor as a function of the load transmitted to the motor by the brush;
   sensing means for sensing the brush speeds resulting from said height adjustments; and
   means responsive to said speed sensing means for controlling said height adjusting means, including means for establishing a height that is a function of the sensed brush speed.

2. A vacuum cleaner as claimed in claim 1, wherein said height adjusting means includes:
   a cam mounted for movement within said vacuum cleaner;
   means for driving said cam being controlled by said controlling means;
   a cam follower abutting said cam and mounted for movement in response to said cam movement
   an offset axle mounted for movement with said cam follower; and
   at least one roller rotatably mounted on said offset axle on which said vacuum cleaner is supported on a surface.

3. A vacuum cleaner as claimed in claim 2, wherein said cam driving means includes a motor and said cam is a dual linear-rise cam.

4. A vacuum cleaner as claimed in claim 2, wherein said cam follower forms a portion of a lever mounted for pivotal movement within said vacuum cleaner, said lever including a sleeve slidably mounted on said offset axle.

5. A vacuum cleaner as claimed in claim 1, wherein said controlling means includes a control circuit having a program controlled means for operating said height adjusting means.

6. A vacuum cleaner as claimed in claim 1, further compromising; a manually operable switch connected to selectively operate said controlling means responsive to said speed sensing means.

7. A vacuum cleaner as claimed in claim 1, wherein said sensing means includes a magnet mounted for rotation with said brush and a pick-up coil mounted adjacent the path of said magnet to sense each rotation of said brush.

8. A vacuum cleaner for use in cleaning a floor covering, comprising:
   means for generating a suction;
   a suction nozzle in fluid communication with said suction generating means;
   a brush mounted for rotation in said suction nozzle;
   means for rotatably driving said brush;
   means for sensing the rotational speed of said brush;
   a motor mounted adjacent said suction nozzle;
   a cam mounted for rotation by said motor;
   a cam follower abutting said cam;
   means for adjusting the height of said suction nozzle from the surface being cleaned in response to movement of said cam follower;
   a program controlled means for receiving signals from said speed sensing means and operating said motor, said program controlled means including:
      means for comparing a current brush speed to a predetermined brush speed; and
      means for terminating operation of said motor when said predetermined brush speed is sensed.

9. A vacuum cleaner as claimed in claim 8, further including user operable means for causing said program controlled means to operate said height adjusting means.

10. A method for adjusting a vacuum nozzle height in a vacuum cleaner having a brush mounted for rotation within a said nozzle and means for raising and lowering said nozzle in relation to a surface being cleaned, comprising the steps of:
    (a) rotatably driving a brush with a motor;
    (b) adjusting the height of the vacuum nozzle and brush relative to a surface to be cleaned whereupon the speed of the motor will vary as a function of the load transmitted to the motor by the brush;
    (c) sensing the resultant brush speeds during step (b) height adjustments;
    (d) selecting a height corresponding to a predetermined brush speed characteristic;
    (e) and terminating step (b) to maintain operation of the cleaner at the selected height and corresponding speed of step (d).

11. A method as claimed in claim 10, wherein steps (d) and (e) include the steps of:
    (i) establishing a highest brush speed for the surface to be cleaned;
    (ii) comparing a predetermined set speed to said highest brush speed;
    (iii) stopping said height adjustment at a height corresponding to said highest brush speed if said predetermined set speed is higher than said highest speed;
    (iv) establishing a lowest brush speed for the floor surface;
    (v) comparing said predetermined set speed to said lowest brush speed; and
    (vi) stopping said height adjustment at a height corresponding to said lowest brush speed if said predetermined set speed is lower than said lowest brush speed.

12. A method as claimed in claim 10 wherein steps (d) and (e) include the steps of:
 (1) substracting a small tolerance from said predetermined brush speed characteristic;
 (2) comparing the currently sensed speed of the brush to said predetermined speed characteristic minus a small tolerance;
 (3) adding a small tolerance to said predetermined speed characteristic if in step (2) the currently sensed speed is larger;
 (4) comparing the currently sensed speed of the brush to said predetermined speed characteristic plus a small tolerance; and
 (5) stopping said height adjustment at a height corresponding to the currently sensed speed of steps (2) and (4).

13. A canister vacuum cleaner for cleaning floor surfaces, comprising:
 a canister suction unit for generating a vacuum air flow;
 a suction hose connected at a first end to said canister suction unit to conduct said vacuum air flow;
 a handle connected to a second opposite end of said suction hose;
 a manually operable switch mounted on said handle;
 a wand connected at a first end to said handle and being in fluid communication with said suction hose;
 a vacuum head connected to a second opposite end of said wand, said vacuum head including a vacuum nozzle in fluid communication with said wand;
 a brush rotatably mounted within said vacuum nozzle for contact with a floor surface when said vacuum nozzle is adjacent the floor;
 a motor within said vacuum head connected to rotate said brush;
 a speed sensor mounted in said vacuum head and connected to sense the speed of at least one of said brush and said motor;
 means for adjusting the height of said vacuum nozzle from the floor surface; and
 a control circuit connected to receive signals from said speed sensor and being connected to operate said height adjusting means, said control circuit including a programmed control unit having means for causing operation of said height adjusting means to terminate when a signal from said speed sensor is substantially equal to a predetermined signal.

14. A vacuum cleaner as claimed in claim 13, wherein said height adjusting means includes:
 a second motor connected for control by said control circuit;
 a cam mounted for rotation by said second motor;
 a cam follower abutting said cam and being movable in response to rotation of said cam;
 at least one roller mounted in said vacuum head and being movable in response to movement of said cam follower, movement of said at least one roller causing variation in the distance between said vacuum nozzle and the floor surface on which said vacuum head rests.

15. A vacuum cleaner as claimed in claim 13, wherein said programmed control unit is a microprocessor.

* * * * *